United States Patent
Park et al.

(10) Patent No.: US 6,577,878 B1
(45) Date of Patent: Jun. 10, 2003

(54) BASE TRANSCEIVER STATION OF DIGITAL MOBILE TELECOMMUNICATION SYSTEM

(75) Inventors: Seong Ik Park, Sungnam-shi (KR); Hae Sik Kim, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 494 days.

(21) Appl. No.: 09/611,254

(22) Filed: Jul. 6, 2000

(30) Foreign Application Priority Data

Jul. 9, 1999 (KR) ........................................ 1999-27725

(51) Int. Cl.[7] ................................ H04B 1/38; H04J 3/06
(52) U.S. Cl. ........................................ 455/561; 370/350
(58) Field of Search .................................. 455/561, 424, 455/560, 502, 524, 525; 370/328, 329, 330, 350, 503

(56) References Cited

U.S. PATENT DOCUMENTS 6,101,400 A * 8/2000 Ogaz et al. ................. 455/561
6,175,737 B1 * 1/2001 Kao ............................. 455/447
6,230,026 B1 * 5/2001 Schwaller et al. .......... 455/561
6,373,834 B1 * 4/2002 Lundh et al. ............... 370/350

FOREIGN PATENT DOCUMENTS

WO    WO 96/27269    9/1996

* cited by examiner

Primary Examiner—Charles N. Appiah
(74) Attorney, Agent, or Firm—Merchant & Gould P.C.

(57) ABSTRACT

A base transceiver station of a digital mobile telecommunication system which is separated into a remote site part including a radio frequency unit and a hub site part including components other than the radio frequency unit and wherein the hub site part is miniaturized so that the entire base transceiver station can be readily installed under the optimum conditions to maximize the quality of speech. A remote site part control system can be modified in a software manner with no addition of separate hardware resources when the entire base transceiver station is increased in capacity.

10 Claims, 6 Drawing Sheets

Fig. 6

BASE TRANSCEIVER STATION OF DIGITAL MOBILE TELECOMMUNICATION SYSTEM

BACKGROUND OF THE INVENTION

1. Field of the Invention

The present invention relates in general to base transceiver stations of digital mobile telecommunication systems, and more particularly to a base transceiver station of a digital mobile telecommunication system which is separated into a remote site base transceiver station (referred to hereinafter as a remote site BTS) including a radio frequency unit (referred to hereinafter as RFU) and a hub site base transceiver station (referred to hereinafter as a hub site BTS) including components other than the RFU and wherein a base transceiver station interconnection network is used to control the remote site BTS, so that the entire base transceiver station can be installed under the optimum conditions to maximize the quality of speech.

2. Description of the Prior Art

In a digital mobile telecommunication system such as a personal communication system (PCS) or digital cellular system (DCS), generally, a base transceiver station functions to transmit and receive data and voice over a radio channel, control a terminal (e.g., a PCS or DCS terminal), monitor the quality of speech of the terminal and interconnect the terminal and a base station controller (referred to hereinafter as BSC). Namely, the base transceiver station is located between a mobile station and a BSC to interface between wired and wireless channels and perform main functions associated with a radio link. For example, the main functions associated with the radio link may be a function of allocating and managing forward link power to code division multiplex access (CDMA) frequency, channel and frame option resources, a function of processing an outgoing call signal, incoming call signal, soft handoff call signal and hard handoff call signal and a function of receiving and managing global positioning system (GPS) timing information and providing system timing information to the mobile station and base transceiver station.

The base transceiver station is further adapted to perform a function of transmitting and receiving radio signals over a pilot channel, synchronization channel, access channel, paging channel and traffic channel, a function of routing traffic and control information to the BSC and error detection/statistical information collection/report functions.

Figure 1:
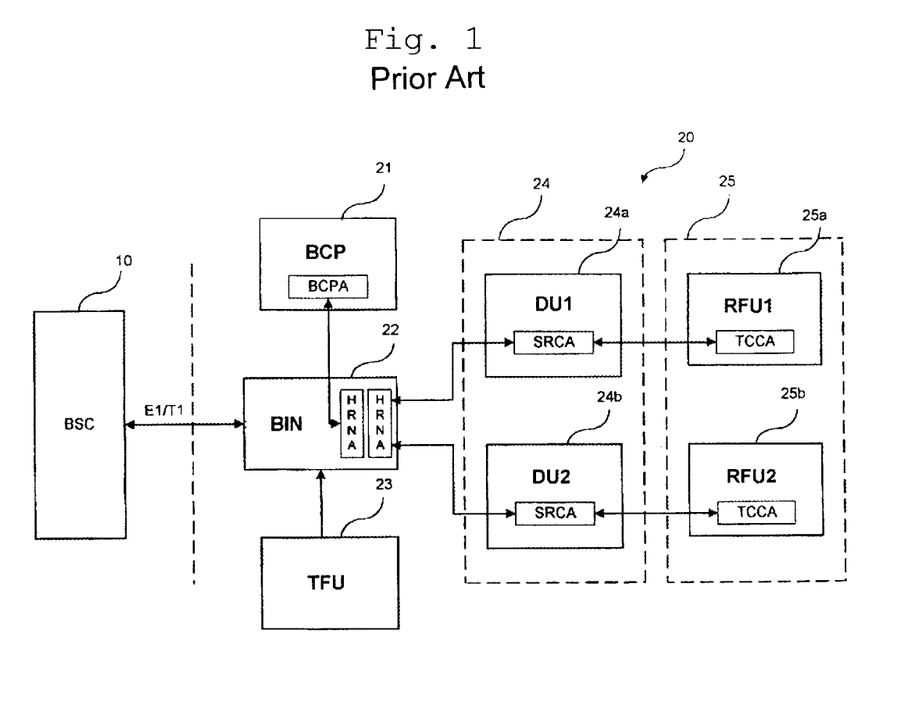
FIG. 1 is a block diagram of a conventional base transceiver station of a digital mobile telecommunication system.

With reference to FIG. 1, there is shown in block form the construction of a conventional base transceiver station of a digital mobile telecommunication system, which is denoted by the reference numeral 20. As shown in this drawing, the base transceiver station 20 comprises a base transceiver station control processor (referred to hereinafter as BCP) 21 for managing and controlling the entire operation of the base transceiver station 20, a base transceiver station interconnection network (referred to hereinafter as BIN) 22 for performing a packet router function between the base transceiver station 20 and a BSC 10 through an E1 line or T1 line and interfacing high-level data link control (HDLC) packet data between processors in the base transceiver station 20, a time and frequency unit (referred to hereinafter as TFU) 23 for generating a reference frequency and timing synchronization signal to synchronize the processors in the base transceiver station 20 and perform timing synchronization with an adjacent base transceiver station, a digital unit (referred to hereinafter as DU) 24 for modulating and demodulating data and voice signals being transmitted and received over a CDMA channel, and an RFU 25 for converting an ultrahigh frequency (UHF) signal from a mobile station into an intermediate frequency (IF) signal, transferring the converted IF signal to the DU 24, converting an IF signal from the DU 24 into a UHF signal, amplifying the converted UHF signal to a predetermined level and radiating the amplified UHF signal over the air.

A description will hereinafter be given of detailed functions of the above-mentioned components of the conventional base transceiver station 20 of the digital mobile telecommunication system.

The BIN 22 provides an interface with the BSC 10 and an internal communication line to the base transceiver station 20 on the basis of the packet routing function.

The BCP 21 controls and diagnoses the entire operation of the base transceiver station 20 and performs an appropriate operation based on the diagnosed result. Further, the BCP 21 acts to download software associated with initialization of the base transceiver station 20.

The DU 24 acts to process voice and data signals being transmitted and received to/from each terminal. To this end, the DU 24 consists of first and second DUs 24a and 24b as shown in FIG. 1. That is, the DU 24 is adapted to process all signals associated with CDMA.

The RFU 25 includes first and second RFUs 25a and 25b for converting modulated data and voice signals from the first and second DUs 24a and 24b into RF signals, transmitting the converted RF signals to a terminal, demodulating modulated data and voice signals from the terminal, converting the demodulated signals into digital signals and transferring the converted digital signals to the first and second DUs 24a and 24b, respectively. The TFU 23 functions to receive information relating to a reference time necessary to the base transceiver station 20 from a GPS and supply the received information to the base transceiver station 20. As a result, all units in the base transceiver station 20 are synchronized with a GPS time and thus have the same timing.

For the purpose of implementing communication from the BCP 21 to RFU 25 in the base transceiver station 20 of the digital mobile telecommunication system, inter-processor communication of the respective constituting elements must be enabled. For the inter-processor communication, a unique address must be assigned to every constituting element board. Now, a description will be given of a system for assigning addresses respectively to the processors in the base transceiver station 20 and an inter-processor communication system implemented in the base transceiver station 20.

Figure 2:
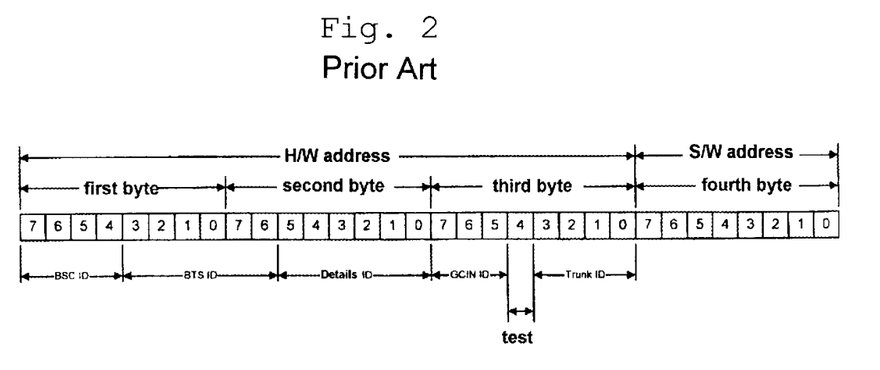
FIG. 2 is a view illustrating a 4-byte address system for inter-processor communication in the conventional base transceiver station of FIG. 1.
Figure 3:
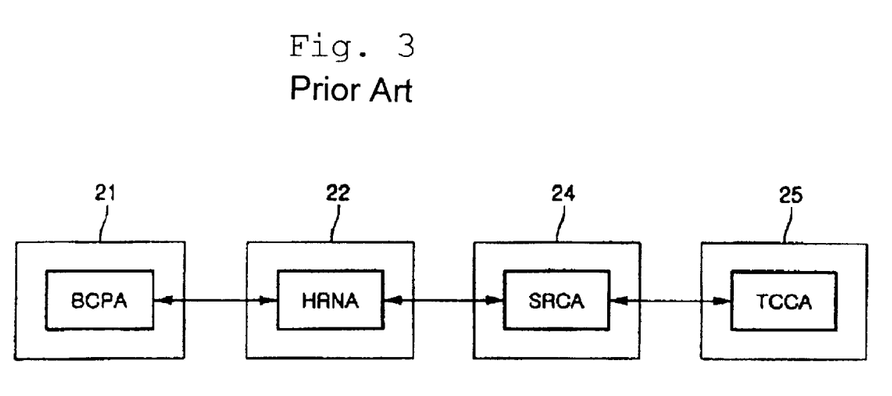
FIG. 3 is a block diagram showing a control communication system of the conventional base transceiver station of FIG. 1.

FIG. 2 is a view illustrating a 4-byte address system for inter-processor communication in the conventional base transceiver station 20 of FIG. 1 and FIG. 3 is a block diagram showing a control communication system of the conventional base transceiver station 20 of FIG. 1.

Noticeably, an HDLC packet is used for inter-processor communication in the digital mobile telecommunication system. The HDLC packet is composed of a header and data, which header contains a source address and a destination address. Each constituting element in the base transceiver station 20 of FIG. 1 compares the destination address contained in the HDLC packet header with its unique address and receives the HDLC packet data only when the two addresses are the same. In this manner, the inter-processor communication is made in the base transceiver station 20. Here, the unique addresses of the respective constituting elements shown in FIG. 1 are based on the 4-byte address system as shown in FIG. 2. A hardware address is composed of high-order three bytes of the 4-byte address system shown in FIG. 2 and a software address is composed of a low-order one byte, or fourth byte, of the 4-byte address system.

The hardware address (high-order three bytes) signifies an address that can be set using jumpers on backboards of the respective constituting elements in FIG. 1, and the software address signifies an address that can be assigned according to a program. The hardware address is provided with a BSC identifier (ID), BTS ID, details ID, GCIN ID, test ID and trunk ID. The BSC ID is composed of high-order four bits of the first byte, the BTS ID is composed of the remaining four bits of the first byte and high-order 2 bits of the second byte (six bits in total) and the details ID is composed of the remaining six bits of the second byte. The GCIN ID is composed of high-order three bits of the third byte, the test ID is composed of the fourth bit of the third byte and the trunk ID is composed of the remaining low-order four bits of the third byte.

On the basis of the above address system, the base transceiver station 20 of the digital mobile telecommunication system is provided with an upper block having the above one hardware address and a lower block having only the above software address. The upper block checks a software address in an HDLC packet and distributes HDLC packet data to the lower block in accordance with the checked result. In other words, the DU 24 as an upper block checks a software address in an HDLC packet from the BIN and distributes HDLC packet data to the RFU 25 as a lower block in accordance with the checked result. Namely, if a communication line is connected from the BCP 21 to the DU 24, then the upper block, or DU 24, checks a software address in an HDLC packet inputted via the BIN 22 and distributes HDLC packet data to the lower block, or RFU 25, in accordance with the checked result. As a result, a hardware address is not necessarily required because only the software address of the 4-byte address system shown in FIG. 2 is assigned to the RFU 25 and the DU 24 can receive data. Such a control communication system is shown in FIG. 3. Referring to FIG. 3, the BCP 21, BIN 22, DU 24 and RFU 25 contain processors for controlling the associated units, respectively. That is, the BCP 21 contains a base transceiver station control processor assembly (BCPA) and the BIN 22 contains a high-performance IPC routing node assembly (HRNA). Also, the DU 24 and RFU 25 contain a shelf control and routing card assembly (SRCA) and a transceiver control card assembly (TCCA), respectively.

The TCCA controlling the RFU 25 is connected by wire to the SRCA in the DU 24. If the BCPA in the BCP 21 sends a TCCA control command according to an application program, then the HRNA in the BIN 22 transfers an HDLC packet to the SRCA in the DU 24. Subsequently, the SRCA in the DU 24 checks a software address in the received HDLC packet and compares it with a unique address assigned thereto. In the case where the software address and unique address are the same, the SRCA in the DU 24 transfers HDLC packet data to the TCCA in the RFU 25. Communication from the TCCA to BCPA is advanced in the opposite order to the above flow and a description thereof will thus be omitted.

However, the above-mentioned conventional base transceiver station 20 of the digital mobile telecommunication system is disadvantageous in that all components are installed in one device, resulting in increases in the volume and capacity of the base transceiver station 20.

The increased volume of the base transceiver station 20 makes it hard to choose a place where the base transceiver station is installable and thus install the base transceiver station in a place effecting the optimum propagation.

Figure 4:
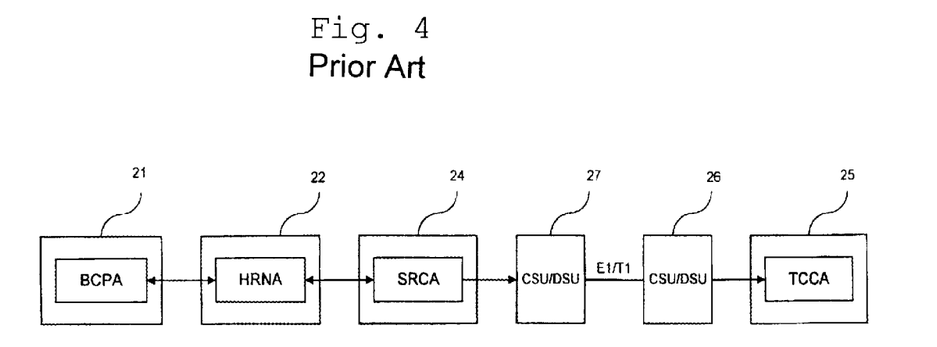
FIG. 4 is a block diagram showing a CSU/DSU-based control communication system of the conventional base transceiver station of FIG. 1.

One conventional approach to solving the above problems is to separate the base transceiver station 20 into a hub site BTS and a remote site BTS including the RFU 25, as shown in FIG. 4. In this approach, because the SRCA in the DU 24 and the TCCA in the RFU 25 are not interconnected by wire, a T1 or E1 line is installed between the TCCA and SRCA and a channel service unit (referred to hereinafter as CSU) or data service unit (referred to hereinafter as DSU) is installed in each end of the E1 or T1 line, thereby performing control communication between the TCCA and SRCA.

The above approach is desirable to readily implement the inter-processor communication by adding the hardware, or CSU/DSU and E1/T1 line, to the existing construction while maintaining the control communication system as shown in FIG. 3 as it is, but disadvantageous in that the above hardware is additionally required with an increase in the capacity of the base transceiver station 20, which leads to an increase in installation cost.

SUMMARY OF THE INVENTION

Therefore, the present invention has been made in view of the above problems, and it is an object of the present invention to provide a base transceiver station of a digital mobile telecommunication system which is separated into a remote site BTS including a radio frequency unit and a hub site BTS including components other than the radio frequency unit and wherein the hub site BTS is miniaturized so that the entire base transceiver station can be readily installed under the optimum conditions to maximize the quality of speech.

It is another object of the present invention to provide a base transceiver station of a digital mobile telecommunication system wherein a remote site BTS (including a radio frequency unit) and a hub site BTS (including components other than the radio frequency unit) are interconnected via a T1/E1 line and a base transceiver station interconnection network so that a remote site BTS control system can be modified in a software manner with no addition of separate hardware resources when the entire base transceiver station is increased in capacity.

In accordance with the present invention, the above and other objects can be accomplished by a provision of a base transceiver station of a digital mobile telecommunication system comprising a hub site base transceiver station (hub site BTS) including a base transceiver station control processor, a first time and frequency unit and at least one digital unit and a remote site base transceiver station (remote site BTS), wherein the hub site BTS further includes a first base transceiver station interconnection network for interfacing control data from the control processor to each processor in the base transceiver station; and a first radio interface for transmitting an output signal from the hub site BTS by radio to the remote site BTS; and wherein the remote site BTS includes a second base transceiver station interconnection network for receiving the control data from the first interconnection network and interfacing it to a processor of each constituting element in the remote site BTS; a second radio interface for transmitting an output signal from the remote site BTS by radio to the hub site BTS; a second time and frequency unit for generating a reference frequency and timing synchronization signal to synchronize each processor in the remote site BTS and performing timing synchronization with the hub site BTS; and a plurality of radio frequency units for processing radio frequency signals.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 5:
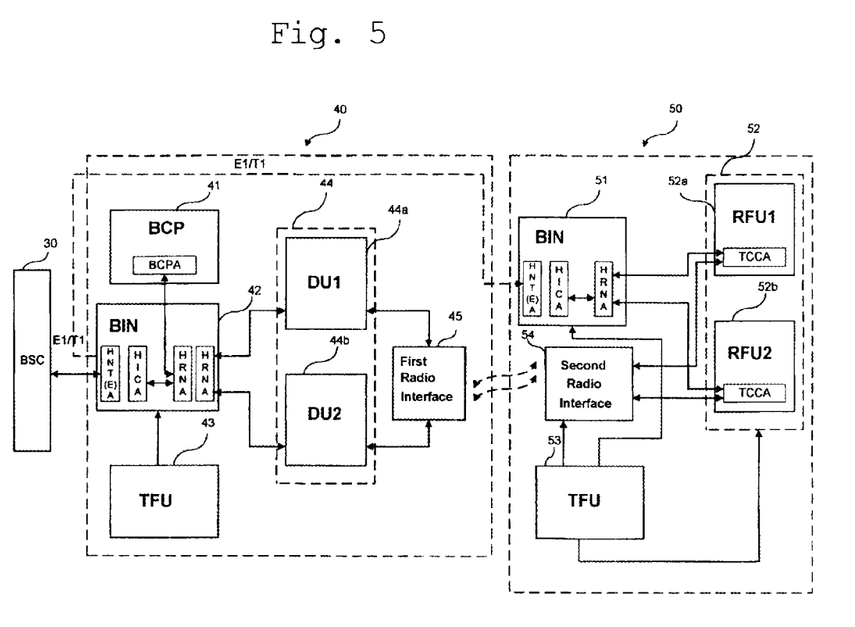
FIG. 5 is a block diagram of a base transceiver station of a digital mobile telecommunication system in accordance with the present invention.
Figure 6:
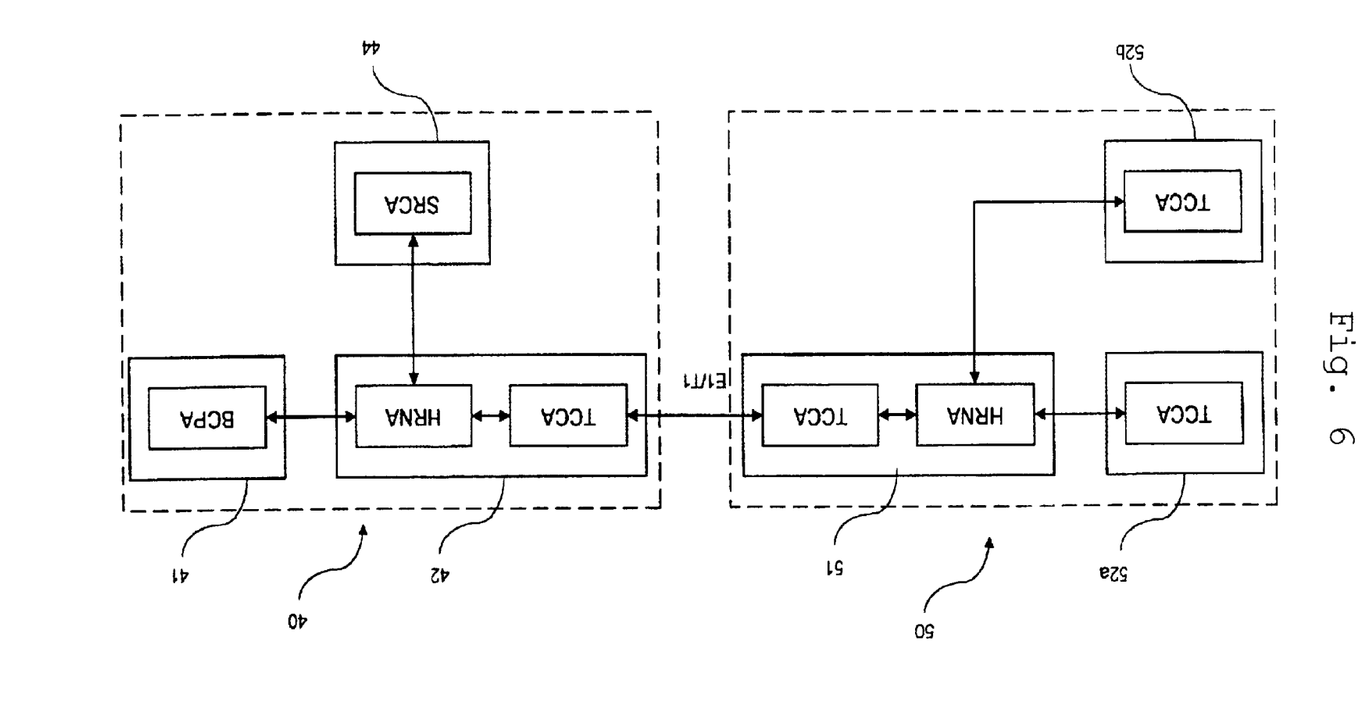
FIG. 6 is a block diagram showing a control communication system of the base transceiver station of FIG. 5 in accordance with the present invention.

FIG. 5 is a block diagram of an embodiment of a base transceiver station of a digital mobile telecommunication system in accordance with the present invention and FIG. 6 is a block diagram showing a control communication system of the base transceiver station of FIG. 5 in accordance with the present invention. First, referring to FIG. 5, the base transceiver station of the present invention is separated into a remote site BTS 50 including an RFU 52 and a hub site BTS 40. A first BIN 42 and second BIN 51 are installed respectively in the hub site BTS 40 and remote site BTS 50 so that the hub site BTS 40 can control the remote site BTS 50. The hub site BTS 40 includes a BCP 41, the first BIN 42, a first TFU 43, a DU 44 and a first radio interface 45, and the remote site BTS 50 includes the second BIN 51, a second TFU 53, a second radio interface 54 and the RFU 52.

Each of the first BIN 42 in the hub site BTS 40 and the second BIN 51 in the remote site BTS 50 includes a high-performance IPC control assembly (HICA) for controlling inter-processor communication in the base transceiver station, an HRNA functioning as a node as a basic unit of an IPC for the inter-processor communication in the associated BTS, and a high-performance routing node and T1/E1 interface board assembly (HNT(E)A) for performing a trunk interfacing function to interconnect the first BIN 42 in the hub site BTS 40 and the second BIN 51 in the remote site BTS 50 via a digital trunk. Further, the first BIN 42 in the hub site BTS 40 and the second BIN 51 in the remote site BTS 50 are interconnected via an E1 or T1line.

The first radio interface 45 in the hub site BTS 40 and the second radio interface 54 in the remote site BTS 50 function to interconnect the DU 44 in the hub site BTS 40 and the RFU 52 in the remote site BTS 50 by radio. Namely, the first radio interface 45 in the hub site BTS 40 transmits CDMA-modulated data and voice signals from the DU 44 by radio to the second radio interface 54 in the remote site BTS 50, receives modulated data and voice signals transmitted by radio from the second radio interface 54 and applies them to the DU 44. The second radio interface 54 in the remote site BTS 50 receives the digital data and voice signals transmitted by radio from the first radio interface 45 in the hub site BTS 40, applies them to a TCCA in the RFU 52 and transmits data and voice signals from the TCCA in the RFU 52 by radio to the first radio interface 45.

The second TFU 53 in the remote site BTS 50 performs the same function as that of the first TFU 43 in the hub site BTS 40. Namely, the second TFU 53 in the remote site BTS 50 generates a reference frequency and timing synchronization signal to synchronize the processors in the remote site BTS 50 and performs timing synchronization with the hub site BTS 40. The remaining ones other than the above-mentioned constituting elements are the same in function as those in FIG. 1 and a description thereof will thus be omitted.

Now, a description will be given of a method and construction for controlling the remote site BTS 50 using the BINs 42 and 51 in the digital mobile telecommunication system in accordance with the present invention.

In the present embodiment, the communication between a BCPA in the BCP 41 in the hub site BTS 40 and the TCCA in the RFU 52 in the remote site BTS 50 is not performed via an SRCA of an upper block, or the DU 44, differently from the conventional communication. This signifies that the TCCA in the RFU 52 must have a hardware address as well as a software address to communicate with the BCPA in the BCP 41. For this reason, a hardware address must be additionally assigned to the TCCA in the RFU 52. An additional hardware address of the TCCA can be generated using the details ID (six bits) of the 4-byte address system shown in FIG. 2. As a result, both an independent address, or hardware address, and a software address can be assigned to the TCCA.

A conventional control communication path from the BCPA to TCCA via SRCA is changed to that via the BINs 42 and 51 on the basis of the additionally generated TCCA address. As a result, for inter-processor communication, according to an application program, the BCPA assigns the additionally generated TCCA address to a destination address part in an HDLC packet and sends control data to the TCCA.

As mentioned above, the TCCA in the remote site BTS 50 has an independent address, or hardware address, as well as a software address. Such a hardware address can be set by a jumper on a backboard of the TCCA. Upon being powered on, the TCCA reads settings by the jumper on its backboard and recognizes its unique hardware address, thereby enabling communication with the BCPA in the hub site BTS 40.

Because the BINs 42 and 51 are installed respectively in the hub site BTS 40 and remote site BTS 50 and interconnected via the E1 or T1 line, firmware set in each of the management controllers, or HICAs, of the BINs 42 and 51 must be modified for interconnecting the HNT(E)A in the remote site BTS 50 and the HNT(E)A in the bus site BTS 40. However, in the case where the HICA firmware of the first BIN 42 in the hub site BTS 40 and the HICA firmware of the second BIN 51 in the remote site BTS 50 are modified separately from each other, they may be confusedly installed and the management of sources may become complex. In order to overcome these problems, according to the present invention, settings by jumpers in the BINs 42 and 51 are provided differently according to the hub site BTS 40 and remote site BTS 50. As a result, the HICA firmware of each of the BINs 42 and 51 reads such jumper settings and determines from the read result whether it belongs to the hub site BTS 40 or remote site BTS 50. This makes it possible to apply one HICA firmware to both of the first and second BINs 42 and 51 in the hub site BTS 40 and remote site BTS 50.

Therefore, a BIN in a conventional base transceiver station has nothing but a node for E1/T1 trunk interfacing with a BSC, but each BIN in the present base transceiver station has an additional node for E1/T1 trunk interfacing between the hub site BTS 40 and remote site BTS 50. For example, the first BIN 42 in the hub site BTS 40 reads jumper settings on its backboard and determines from the read result whether it belongs to the hub site BTS 40. Then, the first BIN 42 in the hub site BTS 40 is connected to the second BIN 51 in the remote site BTS 50 via an additional node for E1/T1 trunk interfacing between. Such an additional node for E1/T1 trunk interfacing is nothing but the HNT(E)A provided in the first BIN 42 in the hub site BTS 40.

Similarly, the second BIN 51 in the remote site BTS 50 reads jumper settings on its backboard and determines from the read result whether it belongs to the remote site BTS 50. Then, the second BIN 51 in the remote site BTS 50 is connected to the first BIN 42 in the hub site BTS 40 via an additional node for E1/T1 trunk interfacing between. Such an additional node for E1/T1 trunk interfacing is nothing but the HNT(E)A provided in the second BIN 51 in the remote site BTS 50.

On the other hand, in the conventional base transceiver station, the SRCA in the DU 24 is one-to-one connected to the TCCA in the RFU 25 as shown in FIG. 1. But, according to the present invention, in the remote site BTS 50, the HRNA in the second BIN 51 is assigned with a plurality of additional nodes so that it can be connected to a plurality of TCCAs in the RFU 52 in a one-to-multiple manner. The plurality of nodes assigned to the HRNA and the plurality of TCCAs are interconnected via HRNA-TCCA connection cables.

Consequently, in the base transceiver station of the digital mobile telecommunication system according to the present invention, an additional address can be assigned to a TCCA. Therefore, in the remote site BTS 50, the HRNA in the second BIN 51 can be connected to a plurality of TCCAs in a one-to-multiple manner. As a result, in the case where the entire base transceiver station is increased in capacity, the remote site BTS control system can be modified in a software manner with no addition of separate hardware resources such as an E1 or T1 line and CSU/DSU.

As apparent from the above description, a base transceiver station of a digital mobile telecommunication system which is separated into a remote site BTS including an RFU and a hub site BTS including components other than the RFU and wherein the hub site BTS is miniaturized. Therefore, the entire base transceiver station can be readily installed in a place effecting the optimum propagation, thereby maximizing the quality of speech. Further, the entire base transceiver station is separated into the hub site BTS and remote site BTS in such a way that the hub site BTS can control the remote site BTS in a centralized manner, thereby making the repair and maintenance of the entire base transceiver station easy.

Moreover, an additional address can be assigned to a TCCA. Therefore, in the remote site BTS, an HRNA in a BIN can be connected to a plurality of TCCAs in a one-to-multiple manner. As a result, in the case where the entire base transceiver station is increased in capacity, a remote site BTS control system can be modified in a software manner with no addition of separate hardware resources such as an E1 or T1 line and CSU/DSU. This makes it possible to avoid an increase in cost resulting from the addition of separate hardware resources.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A base transceiver station of a digital mobile telecommunication system comprising a hub site base transceiver station (hub site BTS) including a base transceiver station control processor, a first time and frequency unit and at least one digital unit and a remote site base transceiver station (remote site BTS), wherein said hub site BTS further includes:
    a first base transceiver station interconnection network for interfacing control data from said control processor to each processor in said base transceiver station; and
    a first radio interface for transmitting an output signal from said hub site BTS by radio to said remote site BTS; and wherein said remote site BTS includes:
        a second base transceiver station interconnection network for receiving said control data from said first interconnection network and interfacing it to a processor of each constituting element in said remote site BTS;
        a second radio interface for transmitting an output signal from said remote site BTS by radio to said hub site BTS;
        a second time and frequency unit for generating a reference frequency and timing synchronization signal to synchronize each processor in said remote site BTS and performing timing synchronization with said hub site BTS; and
        a plurality of radio frequency units for processing radio frequency signals.

2. The base transceiver station as set forth in claim 1, wherein said control processor includes a base transceiver station control processor assembly for assigning an address of a transceiver control card assembly in each of said radio frequency units of said remote site BTS as a destination address to a header of a high-level data link control packet for inter-processor communication.

3. The base transceiver station as set forth in claim 2, wherein said address of said transceiver control card assembly is set by a jumper on a backboard.

4. The base transceiver station as set forth in claim 1, wherein each of said first inter connection network in said hub site BTS and said second interconnection network in said remote site BTS includes:
    a high-performance IPC control assembly for controlling inter-processor communication in said base transceiver station;
    a high-performance IPC routing node assembly functioning as a node as a basic unit of an IPC for the inter-processor communication in the associated BTS; and
    a high-performance routing node and T1/E1 interface board assembly for performing a trunk interfacing function to interconnect said first interconnection network in said hub site BTS and said second interconnection network in said remote site BTS via a digital trunk.

5. The base transceiver station as set forth in claim 4, wherein said interface board assembly in said first interconnection network and said interface board assembly in said second interconnection network are interconnected via an E1 or T1 line.

6. The base transceiver station as set forth in claim 1, wherein said first interconnection network in said hub site BTS has a node for E1/T1 trunk interfacing with said second interconnection network in said remote site BTS.

7. The base transceiver station as set forth in claim 1, wherein said second interconnection network in said remote site BTS has a node for E1/T1 trunk interfacing with said first interconnection network in said hub site BTS.

8. The base transceiver station as set forth in claim 1, wherein said second interconnection network in said remote site BTS includes a high-performance IPC routing node assembly assigned with a plurality of nodes so that it can be connected to a plurality of transceiver control card assemblies in said radio frequency units.

9. The base transceiver station as set forth in claim 1, wherein jumpers are set differently on backboards of said first interconnection network in said hub site BTS and said second interconnection network in said remote site BTS to discriminate them from each other.

10. The base transceiver station as set forth in claim 1, wherein said second interconnection network in said remote site BTS includes a high-performance IPC routing node assembly connected to a plurality of transceiver control card assemblies in said radio frequency units via connection cables.

\* \* \* \* \*